US012756805B2

(12) United States Patent
Uchiyama

(10) Patent No.: US 12,756,805 B2
(45) Date of Patent: Oct. 6, 2026

(54) CONTROL METHOD FOR PROJECTOR FOR MAINTAINING CONSTANT DISPLAY SIZE

(71) Applicant: SEIKO EPSON CORPORATION, Tokyo (JP)

(72) Inventor: Yoshiteru Uchiyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 344 days.

(21) Appl. No.: 18/515,809

(22) Filed: Nov. 21, 2023

(65) Prior Publication Data

US 2024/0179282 A1 May 30, 2024

(30) Foreign Application Priority Data

Nov. 25, 2022 (JP) ................................ 2022-188603

(51) Int. Cl.
*H04N 9/31* (2006.01)

(52) U.S. Cl.
CPC ......... *H04N 9/3188* (2013.01); *H04N 9/3185* (2013.01)

(58) Field of Classification Search
CPC .. H04N 9/3185; H04N 9/3188; H04N 9/3194; H04N 9/3191; H04N 9/3179; H04N 9/3147
See application file for complete search history.

(56) References Cited

U.S. PATENT DOCUMENTS

| | | | | |
|---|---|---|---|---|
| 11,183,154 | B2 * | 11/2021 | Kimata | G09G 5/38 |
| 2002/0186212 | A1 * | 12/2002 | Matsumoto | H04N 21/4316 345/204 |
| 2004/0261037 | A1 * | 12/2004 | Ording | G06F 3/0481 715/788 |
| 2005/0128530 | A1 * | 6/2005 | Aiba | H04N 5/74 358/448 |
| 2006/0192847 | A1 * | 8/2006 | Watanabe | H04N 7/142 348/E7.079 |
| 2007/0257927 | A1 * | 11/2007 | Sakanishi | H04N 9/12 345/581 |
| 2007/0291047 | A1 * | 12/2007 | Harville | G06T 5/80 345/589 |
| 2007/0291184 | A1 * | 12/2007 | Harville | H04N 9/3185 348/383 |
| 2007/0291185 | A1 * | 12/2007 | Gelb | H04N 9/3194 348/383 |
| 2007/0291189 | A1 * | 12/2007 | Harville | G06F 3/1423 349/7 |

(Continued)

FOREIGN PATENT DOCUMENTS

| | | |
|---|---|---|
| JP | 2010-278840 A | 12/2010 |
| JP | 2014-041225 A | 3/2014 |

*Primary Examiner* — Bao-Luan Q Le
(74) *Attorney, Agent, or Firm* — Dority & Manning, P.A.

(57) ABSTRACT

A control method for a first projector includes receiving designation of a head image of a third user image to be projected in a first size in a projection image in a second user group image, calculating a second size indicating a size of the head image in the projection image when the size of the head image is changed, and adjusting, based on a first ratio, which is a ratio of the second size to the first size, an enlargement ratio of the projection image with respect to the second user group image such that the head image is displayed in the first size in the projection image.

15 Claims, 7 Drawing Sheets

(56) References Cited

U.S. PATENT DOCUMENTS

| | | | | |
|---|---|---|---|---|
| 2007/0291233 | A1* | 12/2007 | Culbertson | H04N 9/3194 353/34 |
| 2010/0046088 | A1 | 2/2010 | Kubota | |
| 2010/0321410 | A1* | 12/2010 | Jenks | G09G 5/005 345/676 |
| 2011/0122147 | A1* | 5/2011 | Yasukawa | H04N 9/3179 345/589 |
| 2012/0257173 | A1* | 10/2012 | Murayama | H04N 9/3194 353/121 |
| 2014/0019894 | A1* | 1/2014 | Mitchell | G06F 3/04817 715/765 |
| 2015/0109401 | A1* | 4/2015 | Kasatani | H04N 5/2628 348/14.07 |
| 2017/0127017 | A1* | 5/2017 | Takahashi | G06F 3/03545 |
| 2017/0127020 | A1* | 5/2017 | Takahashi | H04R 1/406 |

* cited by examiner

CONTROL METHOD FOR PROJECTOR FOR MAINTAINING CONSTANT DISPLAY SIZE

The present application is based on, and claims priority from JP Application Serial Number 2022-188603, filed Nov. 25, 2022, the disclosure of which is hereby incorporated by reference herein in its entirety.

BACKGROUND

1. Technical Field

The present disclosure relates to a control method for a projector, a projector, and a non-transitory computer-readable storage medium storing a program.

2. Related Art

There has been known a technique for displaying an image in an actual size.

For example, JP-A-2014-41225 describes the following content. When simultaneously displaying a plurality of images, a user simply selects and sets which image is a display target in an actual size. Thereafter, a projection device calculates, according to optical enlargement or reduction, an electronic enlargement or reduction ratio to keep a dimension on a display surface constant only for the display target image in the actual size.

In the technique described in JP-A-2014-41225, it is described that, when a plurality of videos are simultaneously displayed, a dimension on a display surface is kept constant only for a display target image in an actual size according to optical enlargement or reduction. However, an operation of the projection device performed when a size of a target image included in an input image is changed is not described. Therefore, when the size of the target image included in the input image is changed, the size of the target image cannot be kept constant in a projection image projected onto a projection surface. It is likely that the target image cannot be displayed in a size desired by the user.

SUMMARY

According to an aspect of the present disclosure, there is provided a control method for a projector, including: receiving designation of a target image to be projected in a first size in, in an input image, a projection image obtained by a projector projecting the input image onto a projection surface; calculating a second size indicating a size of the target image in the projection image when the size of the target image included in the input image is changed; and adjusting, based on a first ratio, which is a ratio of the second size to the first size, an enlargement ratio of the projection image with respect to the input image such that the target image is displayed in the first size in the projection image.

According to another aspect of the present disclosure, there is provided a projector including: an optical device; and at least one processor, the at least one processor executing: receiving designation of a target image to be projected in a first size in, in an input image, a projection image obtained by the optical device projecting the input image onto a projection surface; calculating a second size indicating a size of the target image in the projection image when the size of the target image included in the input image is changed; and adjusting, based on a first ratio, which is a ratio of the second size to the first size, an enlargement ratio of the projection image with respect to the input image such that the target image is displayed in the first size in the projection image.

According to still another aspect of the present disclosure, there is provided a non-transitory computer-readable storage medium storing a program, the program causing a processor to execute: receiving designation of a target image to be projected in a first size in, in an input image, a projection image obtained by a projector projecting the input image onto a projection surface; calculating a second size indicating a size of the target image in the projection image when the size of the target image included in the input image is changed; and adjusting, based on a first ratio, which is a ratio of the second size to the first size, an enlargement ratio of the projection image with respect to the input image such that the target image is displayed in the first size in the projection image.

DESCRIPTION OF EMBODIMENTS

An embodiment of the present disclosure is explained below with reference to the drawings.

1. Overall Configuration of a Meeting System

Figure 1:
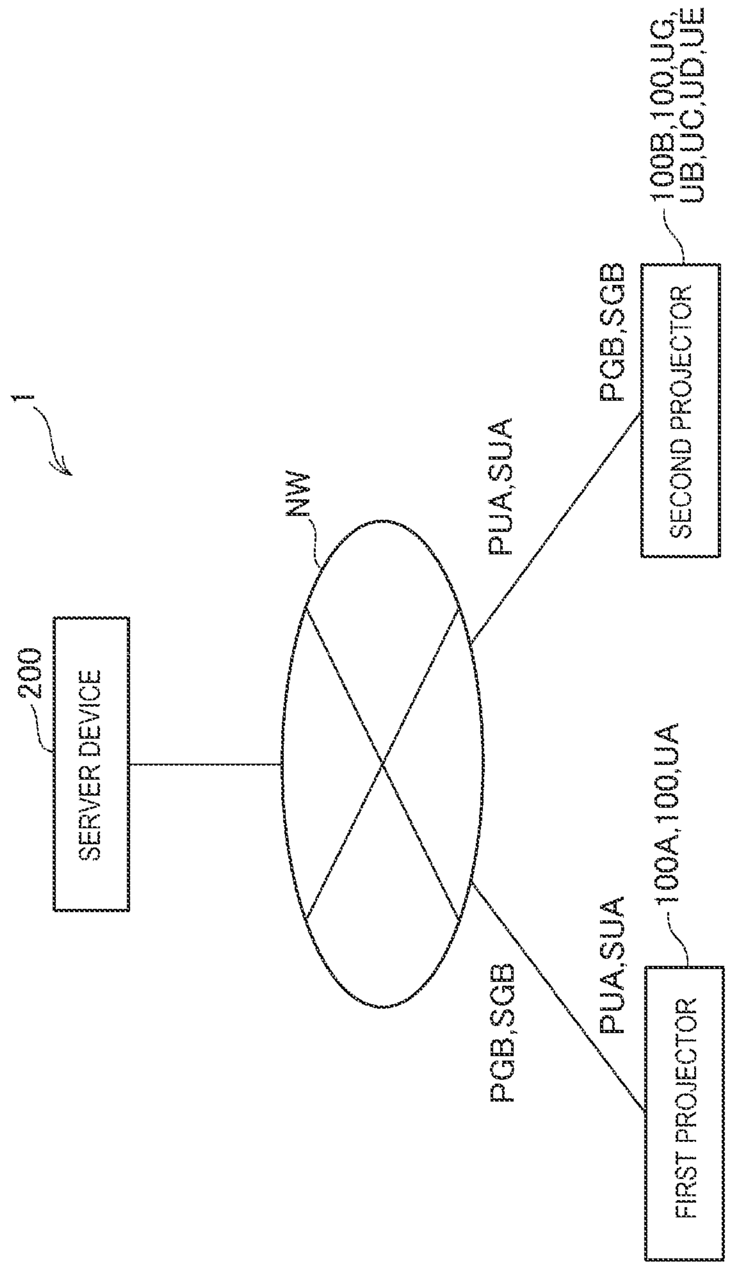
FIG. 1 is a diagram showing an example of a configuration of a meeting system according to an embodiment.

FIG. 1 is a diagram showing an example of a configuration of a meeting system 1 according to this embodiment. As shown in FIG. 1, the meeting system 1 includes projectors 100 and a server device 200. The projectors 100 are configured by a first projector 100A and a second projector 100B.

Each of the first projector 100A and the second projector 100B is communicably connected to the server device 200 via a network NW. The network NW is, for example, the Internet.

A first user UA operates the first projector 100A. At least one of a second user UB, a third user UC, a fourth user UD, and a fifth user UE operates the second projector 100B. The first user UA and the second user UB to the fifth user UE execute a meeting via the meeting system 1. The second user UB to the fifth user UE are sometimes described as second user group UG as well in the following explanation.

In this embodiment, a "meeting" is not limited to a "meeting in a narrow sense" and only has to be a talk by a plurality of persons. Note that the "meeting in a narrow sense" means that "persons concerned gather, exchange information and discuss concerning a specific purpose, agree, and determine a policy". In other words, "discuss" in the "meeting in a narrow sense" does not have to be performed in the "meeting". "Agree and determine a policy" in the "meeting in a narrow sense" does not have to be performed in the "meeting".

The first projector 100A transmits a first user image PUA and first voice information SUA to the server device 200. The first user image PUA is an image of the first user UA. The first user image PUA is generated by a camera 180 disposed in the first projector 100A. The first voice information SUA indicates voice uttered by the first user UA. The first voice information SUA is generated by a microphone 160 disposed in the first projector 100A.

The camera 180 and the microphone 160 are further explained with reference to FIG. 2.

The second projector 100B transmits a second user group image PGB and second voice group information SGB to the server device 200. The second user group image PGB includes a second user image PUB, a third user image PUC, a fourth user image PUD, and a fifth user image PUE. The second user image PUB is an image of the second user UB. The third user image PUC is an image of the third user UC. The fourth user image PUD is an image of the fourth user UD. The fifth user image PUE is an image of the fifth user UE. The second user image PUB to the fifth user image PUE are generated by, for example, the camera 180 disposed in the second projector 100B.

The second voice group information SGB includes second voice information SUB, third voice information SUC, fourth voice information SUD, and fifth voice information SUE. The second voice information SUB indicates voice uttered by the second user UB. The third voice information SUC indicates voice uttered by the third user UC. The fourth voice information SUD indicates voice uttered by the fourth user UD. The fifth voice information SUE indicates voice uttered by the fifth user UE. Each of the second voice information SUB to the fifth voice information SUE is generated by, for example, the microphone 160 disposed in the second projector 100B.

The server device 200 transmits the second user group image PGB and the second voice group information SGB to the first projector 100A. The first projector 100A projects the second user group image PGB from the first projector 100A onto a first screen SCA and displays the second user group image PGB. The first projector 100A outputs voice corresponding to the second voice group information SGB from a speaker 170 disposed in the first projector 100A.

The server device 200 transmits the first user image PUA and the first voice information SUA to the second projector 100B. The second projector 100B projects the first user image PUA from the second projector 100B onto a second screen SCB and displays the first user image PUA. The second projector 100B outputs voice corresponding to the first voice information SUA from the speaker 170 disposed in the second projector 100B.

In this embodiment, the server device 200 is wiredly communicably connected to the first projector 100A and the second projector 100B by an Ethernet (registered trademark) cable or the like. However, not only this, but the server device 200 may be wirelessly communicably connected to the first projector 100A and the second projector 100B by Wi-Fi (registered trademark) or the like.

In this embodiment, the network NW is the Internet. However, not only this, but the network NW may be, for example, a WAN (Wide Area Network) or a LAN (Local Area Network).

2. Configuration of the Projector

Subsequently, a configuration of the projectors 100 is explained with reference to FIG. 2. FIG. 2 is a diagram showing an example of a configuration of the first projector 100A according to this embodiment. Since the first projector 100A and the second projector 100B have substantially the same configuration, the configuration of the first projector 100A is explained with reference to FIG. 2. Explanation of the configuration of the second projector 100B is omitted. Note that, in the following explanation, when the first projector 100A and the second projector 100B are not distinguished, the first projector 100A and the second projector 100B are sometimes described as projector 100.

Figure 2:
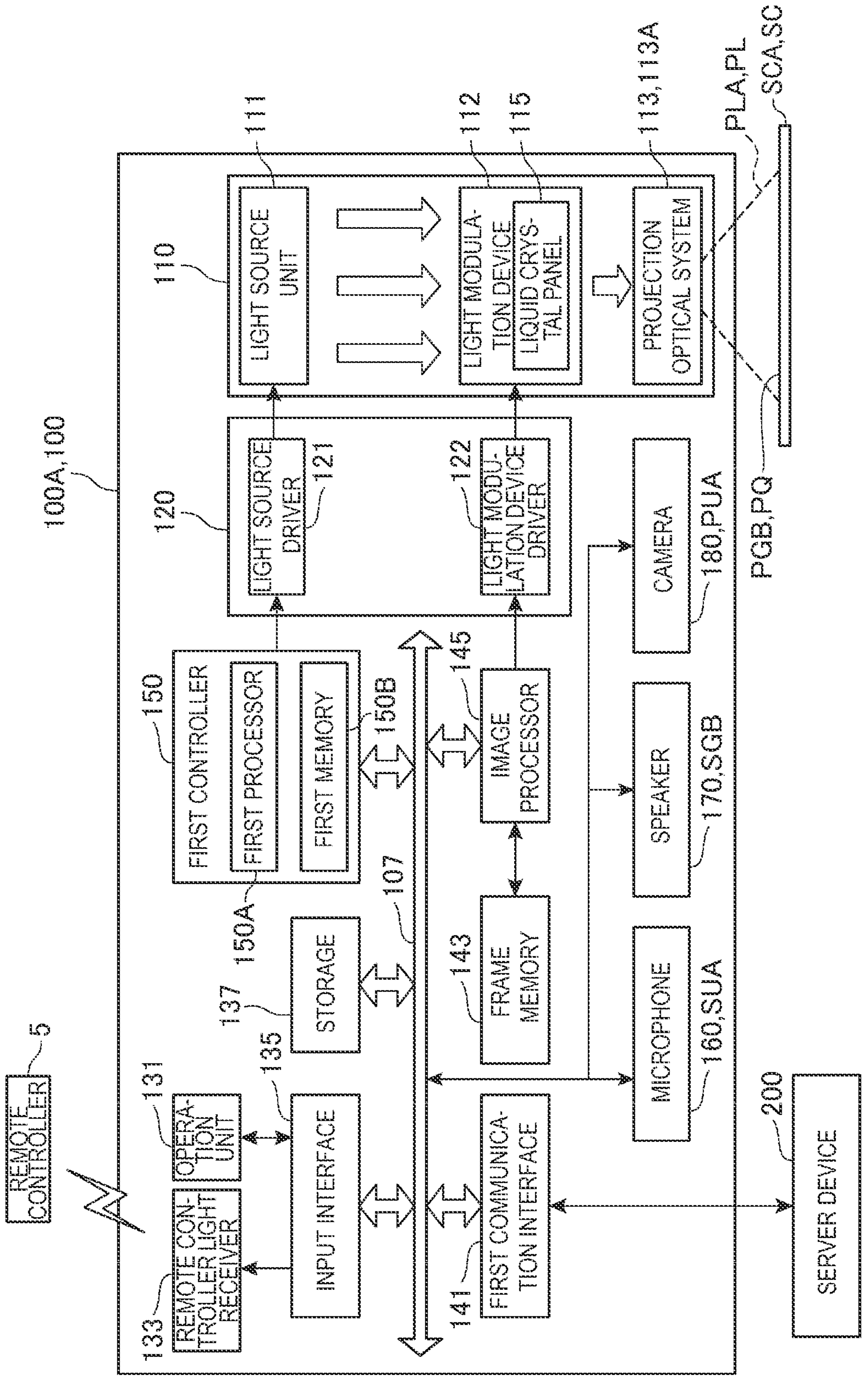
FIG. 2 is a diagram showing an example of a configuration of a projector according to the embodiment.

As shown in FIG. 2, the first projector 100A includes a projecting unit 110 and a driver 120 that drives the projecting unit 110. The projecting unit 110 forms an optical image and projects first image light PLA onto the first screen SCA. Note that, in this embodiment, the projecting unit 110 projects the first image light PLA corresponding to the second user group image PGB onto the first screen SCA. The projecting unit 110 projects the first image light PLA onto the first screen SCA to thereby display a projection image PQ on the first screen SCA.

The projecting unit 110 includes a light source unit 111, a light modulation device 112, and a projection optical system 113. The driver 120 includes a light source driver 121 and a light modulation device driver 122.

The first screen SCA corresponds to an example of the "projection surface".

The light source unit 111 includes a solid-state light source such as an LED (Light Emitting Diode) or a laser light source.

In this embodiment, the light source unit 111 includes the solid-state light source. However, not only this, but the light source unit 111 may include a lamp light source such as a halogen lamp, a Xenon lamp, or an ultrahigh pressure mercury lamp.

The light source unit 111 may include a reflector and an auxiliary reflector that guide light emitted by a light source to the light modulation device 112. Further, the light source unit 111 may include a lens group or a polarization plate for improving an optical characteristic of projected light, a dimming element that reduces a light amount of the light emitted by the light source on a path leading to the light modulation device 112.

The light source driver 121 is connected to an internal bus 107 and, according to an instruction of a first controller 150 also connected to the internal bus 107, turns on and turns off the light source of the light source unit 111 and controls an output of the light source.

The light modulation device 112 includes, for example, three liquid crystal panels 115 corresponding the three primary colors of R, G, and B. R indicates red, G indicates green, B indicates blue. That is, the light modulation device 112 includes the liquid crystal panel 115 corresponding to R light, the liquid crystal panel 115 corresponding to G light, and the liquid crystal panel 115 corresponding to B light.

Light emitted by the light source unit 111 is separated into RGB three color lights, which are respectively made incident on the liquid crystal panels 115 corresponding to the color lights. Each of the three liquid crystal panels 115 is a transmissive liquid crystal panel and modulates transmitted light to generate first image light PLA. First image lights PLA having passed through the liquid crystal panels 115 and modulated are combined by a combination optical system such as a cross dichroic prism and emitted to the projection optical system 113.

In this embodiment, the light modulation device 112 includes the transmissive liquid crystal panels 115 as light modulation elements. However, not only this, but the light modulation elements may be reflective liquid crystal panels or may be digital micromirror devices.

The light modulation device 112 is driven by the light modulation device driver 122. The light modulation device driver 122 is connected to an image processor 145.

Image data corresponding to the primary colors of R, G, and B are input to the light modulation device driver 122 from the image processor 145. The light modulation device driver 122 converts the input image data into data signals suitable for operations of the liquid crystal panels 115. The light modulation device driver 122 applies voltages to pixels of the liquid crystal panels 115 based on the converted data signals and draws images on the liquid crystal panels 115.

The projection optical system 113 includes a projection lens and a mirror that form images of the incident first image lights PLA on a screen SC. The projection optical system 113 includes a zoom mechanism that enlarges or reduces an image to be projected onto the screen SC, a focus adjusting mechanism that adjusts a focus, and a lens shift mechanism that adjusts a projecting direction of the first image light PLA.

The projection optical system 113 corresponds to an example of the "optical device".

The first projector 100A further includes an operation unit 131, a remote controller light receiver 133, an input interface 135, a storage 137, a first communication interface 141, a frame memory 143, an image processor 145, and the first controller 150. The input interface 135, the storage 137, the first communication interface 141, the image processor 145, and the first controller 150 are connected to be capable of performing data communication one another via the internal bus 107.

The operation unit 131 includes various buttons and switches provided on a housing surface of the first projector 100A, generates operation signals corresponding to operation of the buttons and the switches, and outputs the operation signals to the input interface 135. The input interface 135 includes a circuit that outputs the operation signals input from the operation unit 131 to the first controller 150.

The remote controller light receiver 133 receives an infrared signal transmitted from a remote controller 5 and decodes the received infrared signal to generate an operation signal. The remote controller light receiver 133 outputs the generated operation signal to the input interface 135. The input interface 135 includes a circuit that outputs the operation signal input from the remote controller light receiver 133 to the first controller 150.

The storage 137 is, for example, a magnetic recording device such as an HDD (Hard Disk Drive) or a storage device including a semiconductor storage element such as a flash memory or an SSD (Solid State Drive). The storage 137 stores programs to be executed by the first controller 150 and data, image data, and the like processed by the first controller 150.

The first communication interface 141 is a communication interface that executes communication with the server device 200 according to, for example, an Ethernet (registered trademark) standard. The first communication interface 141 includes a connector to which an Ethernet (registered trademark) cable is connected and an interface circuit that processes a signal transmitted through the connector. The first communication interface 141 is an interface substrate including the connector and the interface circuit and is coupled to a main substrate on which a first processor 150A and the like of the first controller 150 are mounted. Alternatively, the connector and the interface circuit of the first communication interface 141 are mounted on the main substrate of the first controller 150. The first communication interface 141 receives the second user group image PGB and the second voice group information SGB from the server device 200. The first communication interface 141 transmits the first user image PUA and the first voice information SUA to the server device 200.

The first controller 150 includes a first memory 150B and the first processor 150A.

The first memory 150B is a storage device that stores, in a nonvolatile manner, programs to be executed by the first processor 150A and data. The first memory 150B is configured with a magnetic storage device, a semiconductor storage element such as a flash ROM (Read Only Memory), or a nonvolatile storage device of another type. The first memory 150B may include a RAM (Random Access Memory) configuring a work area of the first processor 150A. The first memory 150B stores data to be processed by the first controller 150, a first control program PG1 to be executed by the first processor 150A, and the like.

The first processor 150A may be configured with a single processor. A plurality of processors may be configured to function as the first processor 150A. The first processor 150A executes the first control program PG1 to control the units of the first projector 100A. For example, the first processor 150A outputs, to the image processor 145, an execution instruction for image processing corresponding to operation received by the operation unit 131 and the remote controller 5 and parameters used for the image processing. The parameters include, for example, geometrical correction parameters for correcting geometrical distortion of an image to be projected onto the screen SC.

The first processor 150A corresponds to an example of the "at least one processor". The first processor 150A corresponds to an example of the "processor".

The first control program PG1 corresponds to an example of the "program".

The first processor 150A may be configured with an SoC (System-on-a-Chip) integrated with a part or the entire memory 150B and other circuits. The first processor 150A may be configured with a combination of a CPU (Central Processing Unit) that executes programs and a DSP (Digital Signal Processor) that executes predetermined arithmetic processing. All of the functions of the first processor 150A may be implemented in hardware or may be configured using a programmable device.

The image processor 145 and the frame memory 143 can be configured with, for example, an integrated circuit. The integrated circuit includes an LSI (Large-Scale Integration), an ASIC (Application Specific Integrated Circuit), and a PLD (Programmable Logic Device). The PLD includes, for example, an FPGA (Field-Programmable Gate Array). An analog circuit may be provided in a part of a configuration of the integrated circuit. A processor and the integrated circuit may be combined. The combination of the processor and the integrated circuit is called microcontroller (MCU), SoC (System-on-a-Chip), system LSI, chipset, and the like.

The image processor 145 loads image data input from the first communication interface 141 in the frame memory 143. The frame memory 143 includes a plurality of banks. The banks have a storage capacity enough for writing image data for one frame. The frame memory 143 is configured by, for example, an SDRAM (Synchronous Dynamic Random Access Memory).

The image processor 145 performs, on the image data loaded in the frame memory 143, image processing such as resolution conversion processing, resize processing, correction of distortion aberration, shape correction processing, digital zoom processing, and adjustment of a tint and luminance of an image.

The image processor 145 generates a vertical synchronization signal obtained by converting an input frame frequency of the vertical synchronization signal into a drawing frequency. The generated vertical synchronization signal is referred to as output synchronization signal. The image processor 145 the generated outputs output synchronization signal to the light modulation device driver 122.

The first projector 100A further includes the microphone 160, the speaker 170, and the camera 180. Each of the microphone 160, the speaker 170, and the camera 180 is coupled to the first controller 150 to be capable of performing data communication via the internal bus 107.

The microphone 160 generates the first voice information SUA. The first voice information SUA indicates voice uttered by the first user UA. The microphone 160 outputs the first voice information SUA to the first controller 150.

The speaker 170 outputs voice corresponding to the second voice group information SGB according to an instruction from the first controller 150.

The camera 180 generates the first user image PUA. The first user image PUA is an image of the first user UA. The camera 180 outputs the first user image PUA to the first controller 150.

Figure 3:
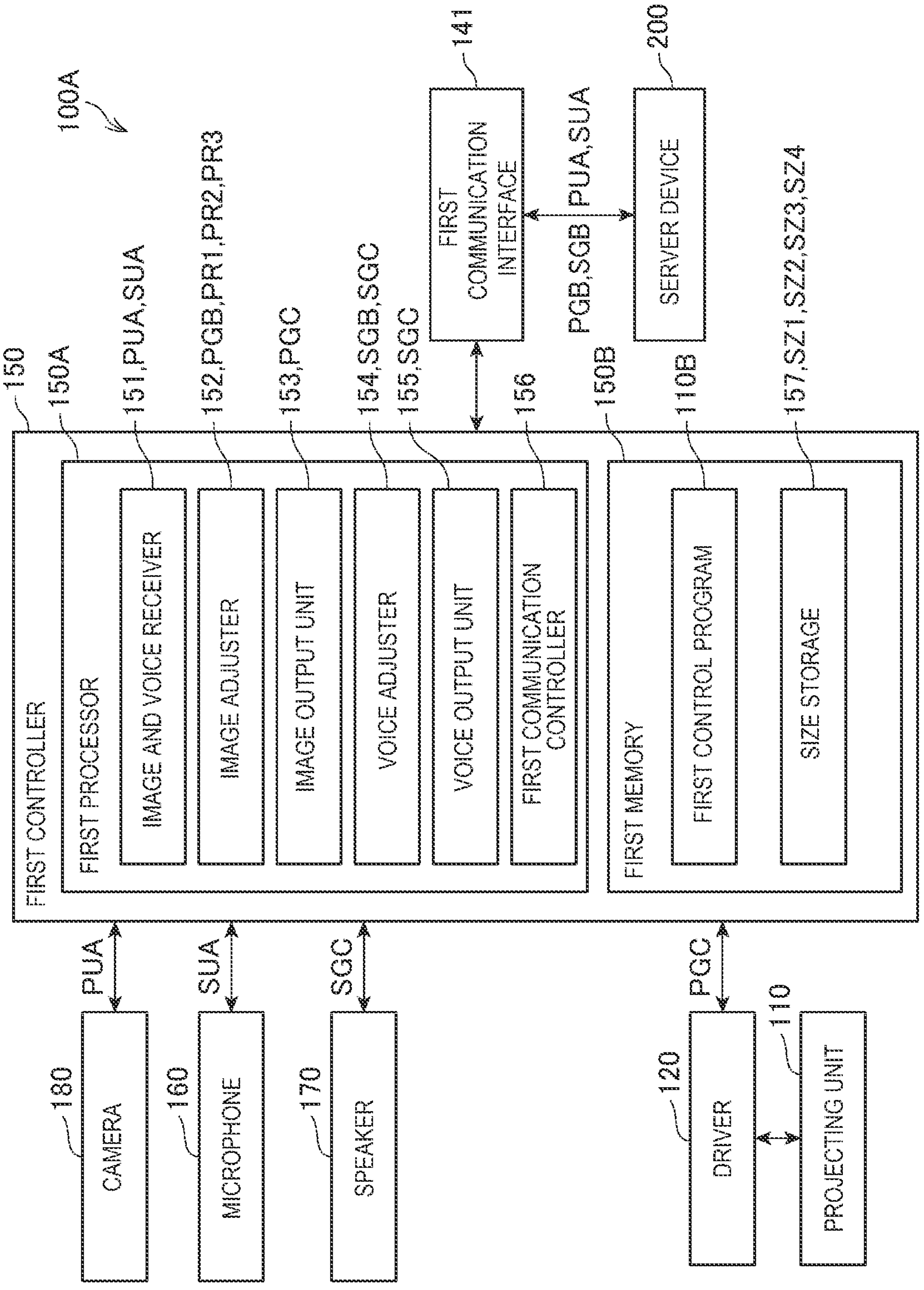
FIG. 3 is a diagram showing an example of a configuration of a first controller of the projector.

Subsequently, a configuration of the first controller 150 is explained with reference to FIG. 3. FIG. 3 is a diagram showing an example of the configuration of the first controller 150 of the first projector 100A. As shown in FIG. 3, the first controller 150 includes an image and voice receiver 151, an image adjuster 152, an image output unit 153, a voice adjuster 154, a voice output unit 155, a first communication controller 156, and a size storage 157. Specifically, the first processor 150A reads out the first control program PG1 from the first memory 150B and executes the first control program PG1 to thereby function as the image and voice receiver 151, the image adjuster 152, the image output unit 153, the voice adjuster 154, the voice output unit 155, and the first communication controller 156. The first processor 150A reads out the first control program PG1 from the first memory 150B and executes the first control program PG1 to thereby cause the first memory 150B to function as the size storage 157.

The size storage 157 stores a first size SZ1, a second size SZ2, and a third size SZ3. The first size SZ1 is, for example, an initial designated size for a head image HC of the third user image PUC in the second user group image PGB projected onto the first screen SCA. The first size SZ1 is determined by the image adjuster 152 based on an instruction from the first user UA and stored in the size storage 157.

The second user group image PGB corresponds to an example of the "input image".

The head image HC of the third user image PUC corresponds to an example of the "target image".

The head image HC of the third user image PUC is further explained with reference to FIGS. 5 and 6.

The second size SZ2 is, for example, a size of the head image HC of the third user image PUC in the second user group image PGB projected onto the first screen SCA. The second size SZ2 is calculated by the image adjuster 152 every time the image adjuster 152 receives the second user group image PGB from the server device 200 and is stored in the size storage 157.

The third size SZ3 is, for example, a second-time designated size for the head image HC of the third user image PUC in the second user group image PGB projected onto the first screen SCA. The third size SZ3 is different from the first size SZ1. The third size SZ3 is determined by the image adjuster 152 based on an instruction from the first user UA and stored in the size storage 157.

In this embodiment, the image adjuster 152 calculates each of the first size SZ1 to the third size SZ3 as, for example, a size of one side of a smallest square including the head image HC of the third user image PUC.

Figure 5:
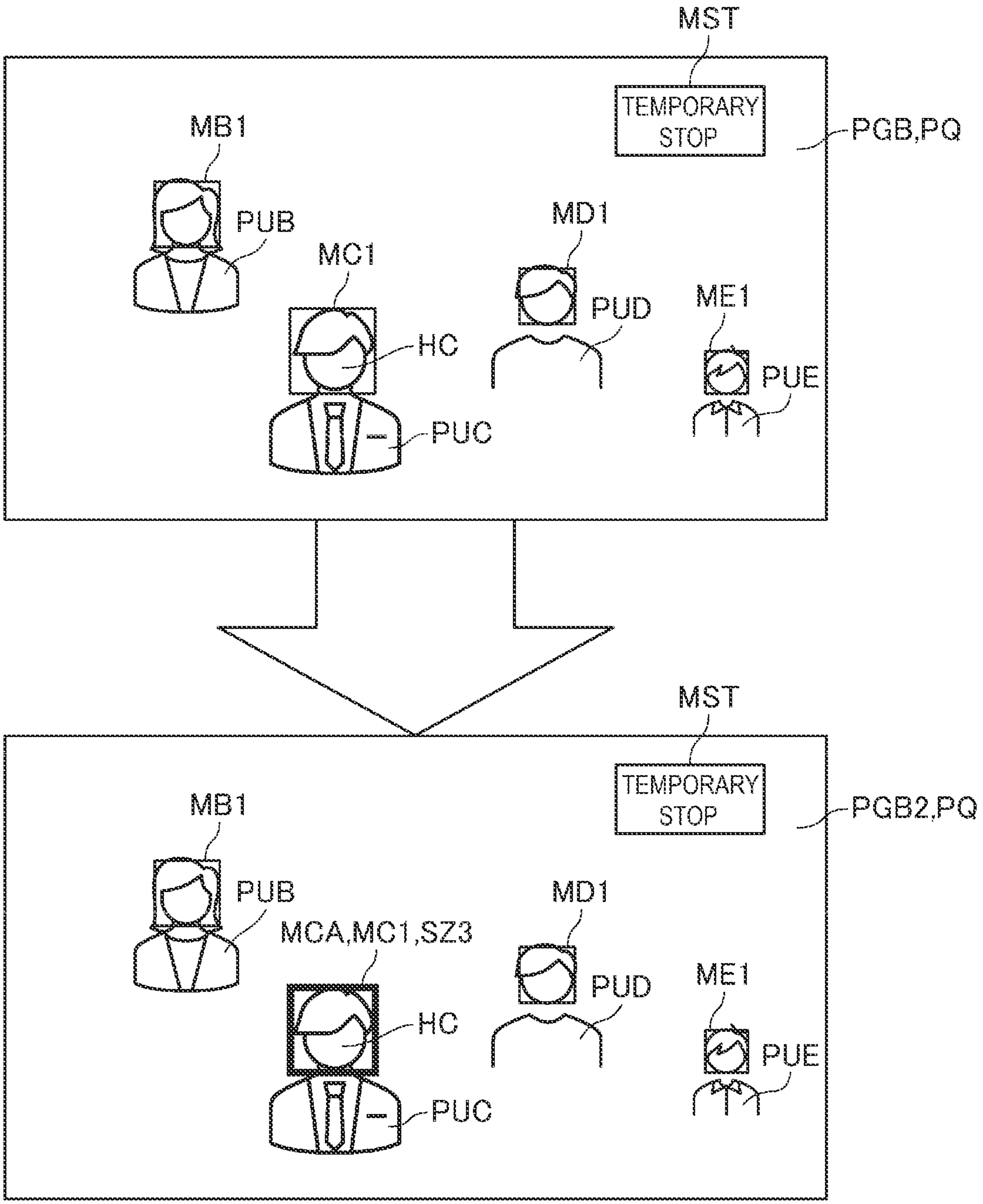
FIG. 5 is a diagram showing an example of a method of designating a size of a target image in a projection image.

An example of the first size SZ1 is shown in FIG. 5. An example of the second size SZ2 is shown in FIG. 6.

The image and voice receiver 151 acquires the first voice information SUA from the microphone 160. The image and voice receiver 151 acquires the first user image PUA from the camera 180. The image and voice receiver 151 transmits the first voice information SUA and the first user image PUA to the server device 200.

The image adjuster 152 receives the second user group image PGB from the server device 200. When the second user group image PGB is projected onto the first screen SCA, the image adjuster 152 calculates, using an enlargement ratio EL, the second size SZ2, which is the size of the head image HC of the third user image PUC in the second user group image PGB.

The enlargement ratio EL indicates a ratio of a size SZS of the second user group image PGB, which is the projection image PQ projected onto the first screen SCA, to a size SZJ of the second user group image PGB, which is an input image.

In this embodiment, the second user group image PGB is projected onto the first screen SCA while an aspect ratio being retained. In this case, the enlargement ratio EL indicates, for example, a ratio of width WS, that is, the length in a long side direction of the second user group image PGB, which is the projection image PQ projected onto the first screen SCA, to width WJ, that is, the length in a long side direction of the second user group image PGB, which is the input image. That is, the enlargement ratio EL is represented by, for example, the following Expression (1). The width WJ of the second user group image PGB, which is the input image, is, for example, the length in a long side direction of an image displayed on the liquid crystal panel 115.

$$EL=WS/WJ \tag{1}$$

First, the image adjuster 152 designates the first size SZ1. The enlargement ratio EL in this case is described as first enlargement ratio EL1. The first enlargement ratio EL1 is, for example, 200.

The image adjuster 152 receives the second user group image PGB from the server device 200. The image adjuster 152 calculates the second size SZ2 with the following Expression (2) using the first enlargement ratio EL1.

$$SZ2=SZJ2\times EL1 \tag{2}$$

where, a size SZJ2 is the size of the head image HC of the third user image PUC in the second user group image PGB, which is the input image. The size SZJ2 is calculated by the image adjuster 152 performing image processing of the second user group image PGB, which is the input image.

The image adjuster 152 calculates a first ratio PR1 with the following Expression (3). The first ratio PR1 is a ratio of the second size SZ2 to the first size SZ1.

$$PR1=SZ2/SZ1 \tag{3}$$

The image adjuster 152 calculates a second enlargement ratio EL2 with the following Expression (4) such that the head image HC of the third user image PUC is displayed in the first size SZ1 in the projection image PQ and adjusts the enlargement ratio EL to be the second enlargement ratio EL2.

$$EL2=EL1/PR1 \quad (4)$$

For example, when the second size SZ2 is larger than the first size SZ1 and, for example, the first ratio PR1 is 10/9, the second enlargement ratio EL2 is reduced to 9/10 of the first enlargement ratio EL1 as indicated by Expression (4). As a result, the size of the head image HC of the third user image PUC in the second user group image PGB, which is the projection image PQ, can be adjusted to the first size SZ1.

By calculating the second enlargement ratio EL2 with Expression (4) ad adjusting the enlargement ratio EL to be the second enlargement ratio EL2 in this way, the size of the head image HC of the third user image PUC in the second user group image PGB, which is the projection image PQ, can be adjusted to the first size SZ1.

Subsequently, a method of adjusting the second enlargement ratio EL2 is explained. There are the following two methods as a method of adjusting the enlargement ratio EL.

A first method is a method of adjusting the second enlargement ratio EL2 with the projection optical system 113 of the first projector 100A. Specifically, the second enlargement ratio EL2 is adjusted by the zoom mechanism of the projection optical system 113 of the first projector 100A. In this case, an adjustable range of the second enlargement ratio EL2 is limited to a predetermined range by a configuration of the zoom mechanism.

A second method is a method of the image adjuster 152 of the first projector 100A adjusting the second enlargement ratio EL2 by scaling, with image processing, the head image HC of the third user image PUC in the second user group image PGB, which is the input image. For example, the image adjuster 152 of the first projector 100A adjusts the second user group image PGB, which is the input image, to be enlarged at the enlargement ratio EL. In this method, a range of the enlargement ratio EL is not limited. However, when the enlargement ratio EL is large, a part of the projection image PQ is likely to protrude from the first screen SCA. Note that the scaling an image means enlarging or reducing the image.

Therefore, for example, when the second enlargement ratio EL2 calculated by the image adjuster 152 is within the predetermined range, the enlargement ratio EL is adjusted by the first method. For example, when the second enlargement ratio EL2 calculated by the image adjuster 152 exceeds the predetermined range, the second enlargement ratio EL2 is adjusted by the second method in addition to the first method.

By performing such control, it is possible to properly control the second enlargement ratio EL2 without the magnitude of the second enlargement ratio EL2 being limited.

When the image adjuster 152 adjusts the enlargement ratio EL to be the second enlargement ratio EL2, the image output unit 153 projects the second user group image PGB onto the first screen SCA.

The voice adjuster 154 receives the second voice group information SGB from the server device 200.

When the image adjuster 152 reduces the enlargement ratio EL, the voice adjuster 154 increases the volume of the third voice information SCU corresponding to the third user image PUC. In this embodiment, when the image adjuster 152 reduces the enlargement ratio EL, the voice adjuster 154 increases the volume of the second voice group information SGB. For example, when the image adjuster 152 reduces the enlargement ratio EL by 10%, the voice adjuster 154 increases the volume of the second voice group information SGB by 10%.

When the image adjuster 152 increases the enlargement ratio EL, the voice adjuster 154 reduces the volume of the third voice information SUC corresponding to the third user image PUC. In this embodiment, when the image adjuster 152 increases the enlargement ratio EL, the voice adjuster 154 reduces the volume of the second voice group information SGB. For example, when the image adjuster 152 increases the enlargement ratio EL by 10%, the voice adjuster 154 reduces the volume of the second voice group information SGB by 10%.

The voice output unit 155 outputs voice corresponding to the second voice group information SGB from the speaker 170 at the volume adjusted by the voice adjuster 154.

The first communication controller 156 transmits the first voice information SUA and the first user image PUA to the server device 200.

The first communication controller 156 receives the second voice group information SGB and the second user group image PGB from the server device 200.

3. Configuration of the Server Device

Figure 4:
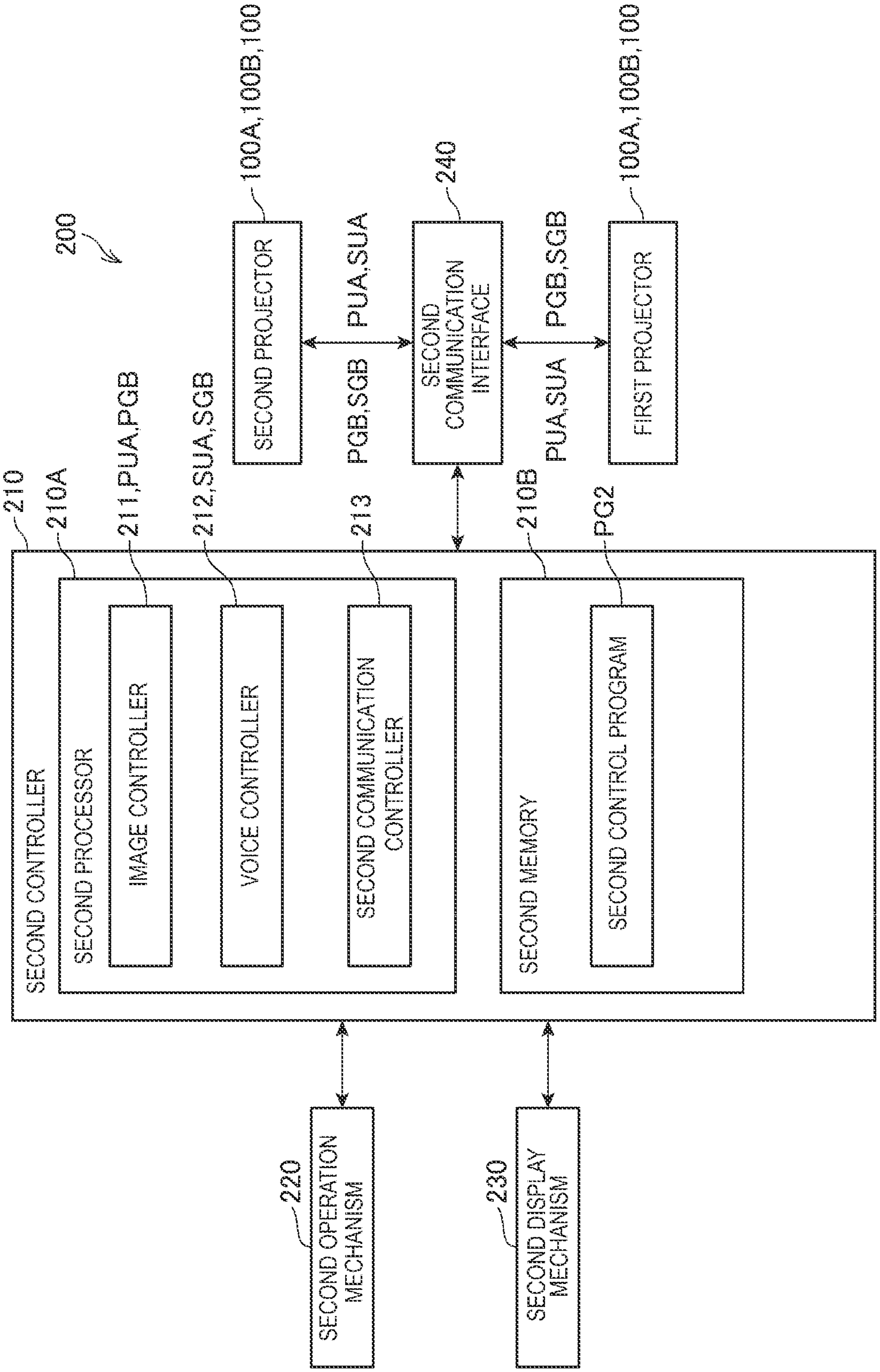
FIG. 4 is a diagram showing an example of a configuration of a server device according to the embodiment.

Subsequently, a configuration of the server device 200 is explained with reference to FIG. 4. FIG. 4 is a diagram showing an example of the configuration of the server device 200 according to this embodiment. As shown in FIG. 4, the server device 200 includes a second controller 210, a second operation mechanism 220, a second display mechanism 230, and a second communication interface 240. The second controller 210 includes a second processor 210A and a second memory 210B. The second controller 210 controls operations of the units of the server device 200.

The second operation mechanism 220, the second display mechanism 230, and the second communication interface 240 are connected to the second controller 210.

The second operation mechanism 220 includes various keys, buttons, and the like and receives operation from a user. The user is, for example, an administrator of the server device 200. The second operation mechanism 220 generates an operation signal corresponding to the received operation and outputs the generated operation signal to the second controller 210.

The second display mechanism 230 includes an LCD and displays various images on the LCD according to an instruction from the second controller 210.

The second communication interface 240 includes a connector and an interface circuit and is connected to the second controller 210. In this embodiment, the second communication interface 240 is an interface for communicating with each of the first projector 100A and the second projector 100B according to, for example, the Ethernet (registered trademark) standard.

The second processor 210A is configured with a CPU, a DSP, a microcomputer, or the like. The second processor 210A may be configured with a plurality of processors or may be configured with a single processor.

The second processor 210A may be hardware programed to implement functions of units explained below. That is, the second processor 210A may be mounted with a second control program PG2 as a hardware circuit. In this case, for example, the second processor 210A is configured with an ASIC, an FPGA, or the like.

In the following explanation, the second processor 210A executes the second control program PG2 to thereby implement various functions of the second controller 210.

The second memory 210B includes a storage region for storing programs to be executed by the second processor 210A and data to be processed by the second processor 210A. The second memory 210B stores the second control program PG2 to be executed by the second processor 210A and various image data, setting data, and the like concerning an operation of the server device 200.

The second memory 210B includes a nonvolatile storage region for storing programs and data in a nonvolatile manner. The second memory 210B may include, for example, a ROM, an HDD, or an SSD as the nonvolatile storage region. The second memory 210B may include a volatile storage region and configure a work area for temporarily storing programs to be executed by the second processor 210A and processing target data. The second memory 210B may include, for example, a RAM as the volatile storage region.

As shown in FIG. 4, the second controller 210 includes an image controller 211, an voice controller 212, and a second communication controller 213. These units are implemented by cooperation of software and hardware, for example, by the second processor 210A executing the second control program PG2.

The image controller 211 receives the first user image PUA from the first projector 100A. The image controller 211 receives the second user group image PGB from the second projector 100B.

The image controller 211 controls the second communication interface 240 and transmits the second user group image PGB to the first projector 100A to thereby cause the first projector 100A to display the second user group image PGB. The image controller 211 controls the second communication interface 240 and transmits the first user image PUA to the second projector 100B to thereby cause the second projector 100B to display the first user image PUA.

The voice controller 212 receives the first voice information SUA from the first projector 100A. The voice controller 212 receives the second voice group information SGB from the second projector 100B.

The voice controller 212 controls the second communication interface 240 and transmits the second voice group information SGB to the first projector 100A to thereby cause the first projector 100A to output voice corresponding to the second voice group information SGB. The voice controller 212 controls the second communication interface 240 and transmits the first voice information SUA to the second projector 100B to thereby cause the second projector 100B to output voice corresponding to the first voice information SUA.

The second communication controller 213 receives the first user image PUA and the first voice information SUA from the first projector 100A. The second communication controller 213 receives the second user group image PGB and the second voice group information SGB from the second projector 100B.

The second communication controller 213 transmits the second user group image PGB and the second voice group information SGB to the first projector 100A. The second communication controller 213 transmits the first user image PUA and the first voice information SUA to the second projector 100B.

4. Specific Examples of a Projection Image

Subsequently, specific examples of the second user group image PGB projected by the first projector 100A are explained with reference to FIGS. 5 and 6.

FIG. 5 is a diagram showing an example of a method of designating a size of a target image in the projection image PQ. In this embodiment, FIG. 5 is a diagram showing an example of a method of designating a size for the head image HC of the third user image PUC in the second user group image PGB projected onto the first screen SCA.

An upper diagram of FIG. 5 shows a first projection image PGB1. The first projection image PGB1 is the projection image PQ projected onto the first screen SCA when the first projector 100A receives a temporary stop instruction from the first user UA while projecting the second user group image PGB onto the first screen SCA. The first user UA performs, on the remote controller 5 or the operation unit 131, operation for instructing the first projector 100A to temporarily stop the projection.

The first projection image PGB1 includes the second user image PUB, the third user image PUC, the fourth user image PUD, and the fifth user image PUE. The second user image PUB to the fifth user image PUE are arrayed from the left to the right in the first projection image PGB1.

The first projection image PGB1 includes a stop mark MST. The stop mark MST indicates that the first projection image PGB1 is an image projected onto the first screen SCA when the projection of the second user group image PGB is temporarily stopped while the second user group image PGB is projected onto the first screen SCA. The stop mark MST is disposed in an upper right part in the first projection image PGB1. In this embodiment, a first user image is not included in the first projection image PGB1.

The first projection image PGB1 includes second mark MB1, a third mark MC1, a fourth mark MD1, and a fifth mark ME1. In this embodiment, since a first user image is not included in the first projection image PGB1, a first mark is not included in the first projection image PGB1.

The second mark MB1 specifies a size of a head image of the second user image PUB. In other words, the second mark MB1 indicates a smallest square including the head image of the second user image PUB. The third mark MC1 specifies a size of the head image HC of the third user image PUC. In other words, the third mark MC1 indicates a smallest square including the head image HC of the third user image PUC. The fourth mark MD1 specifies a size of a head image of the fourth user image PUD. In other words, the fourth mark MD1 indicates a smallest square including the head image of the fourth user image PUD. The fifth mark ME1 specifies a size of a head image of the fifth user image PUE. In other words, the fifth mark ME1 indicates a smallest square including the head image of the fifth user image PUE. A size of the head image HC may be determined based on a range detected from the first projection image PG1 using a face recognition technique or may be determined based on a range in which the first user UA designates sizes of the second mark MB1, the third mark MC1, the fourth mark MD1, and the fifth mark ME1 via the input interface 135.

A lower diagram of FIG. 5 shows a second projection image PGB2. The second projection image PGB2 is the projection image PQ displayed on the first screen SCA when the third mark MC1 displayed in the first projection image PGB1 is selected by the first user UA.

Like the first projection image PGB1, the second projection image PGB2 includes the second user image PUB, the third user image PUC, the fourth user image PUD, the fifth user image PUE, and the stop mark MST. The second projection image PGB2 includes the second mark MB1, the third mark MC1, the fourth mark MD1, and the fifth mark ME1.

Note that, in the second projection image PGB2, a selection mark MCA indicating that the third mark MC1 is selected by the user is displayed as the third mark MC1. In the lower diagram of FIG. 5, the selection mark MCA is indicated by a thick line.

When the third mark MC1 is selected by the first user UA in this way, the image adjuster 152 designates the third size SZ3 as a size of the third mark MC1. That is, the selection mark MCA corresponds to the third size SZ3.

Figure 6:
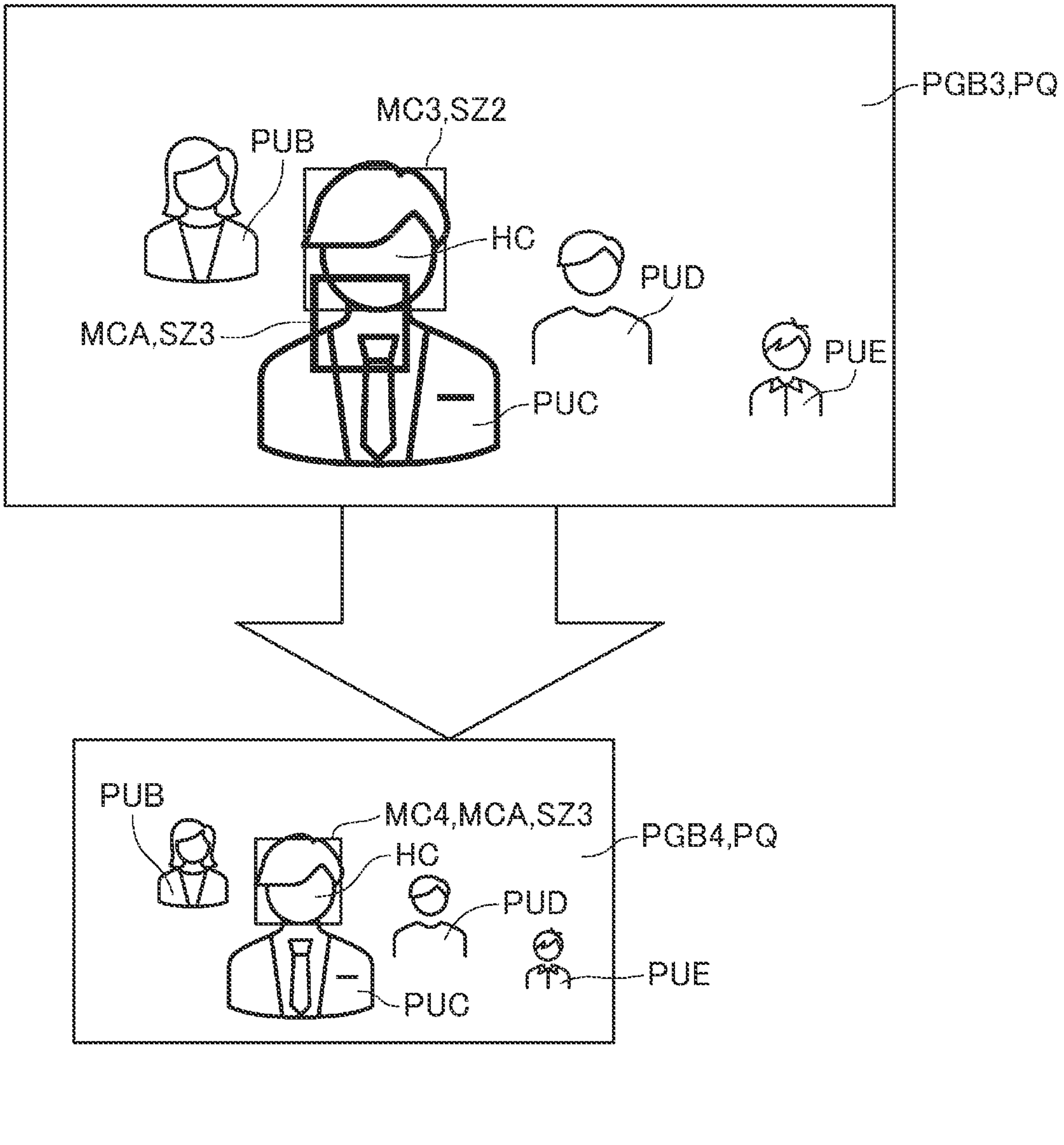
FIG. 6 is a diagram showing an example of a method of adjusting an enlargement ratio when a size is designated.

FIG. 6 is a diagram showing an example of a method of adjusting the enlargement ratio EL when the third size SZ3 is designated.

An upper diagram of FIG. 6 shows a third projection image PGB3 projected onto the first screen SCA when the second size SZ2 of the third user image PUC is changed and the enlargement ratio EL is not adjusted.

The third projection image PGB3 indicates the second user group image PGB projected onto the first screen SCA after the second size SZ2 is designated by the image adjuster 152. Note that a size of the third user image PUC in the third projection image PGB3 shown in the upper diagram of FIG. 6 is larger than the size of the third user image PUC in the second projection image PGB2 shown in the lower diagram of FIG. 5. In other words, the second size SZ2 in the third projection image PGB3 shown in the upper diagram of FIG. 6 is larger than the second size SZ2 in the second projection image PGB2 shown in the lower diagram of FIG. 5.

The third projection image PGB3 indicates an image projected onto the first screen SCA when the image adjuster 152 does not adjust the enlargement ratio EL. That is, the third projection image PGB3 indicates an image projected onto the first screen SCA when the second user group image PGB is projected at the same enlargement ratio EL as the enlargement ratio EL at the time when the second projection image PGB2 shown in the lower diagram of FIG. 5 is projected, that is, the first enlargement ratio EL1.

The third projection image PGB3 includes the second user image PUB, the third user image PUC, the fourth user image PUD, and the fifth user image PUE.

The third projection image PGB3 includes the selection mark MCA and a third mark MC3. The third mark MC3 indicates a size of the head image HC of the third user image PUC in the third projection image PGB3. The third mark MC3 is larger than the selection mark MCA. For example, a size of the third mark MC3 is 3/2 times as large as a size of the selection mark MCA.

A lower diagram of FIG. 6 indicates a fourth projection image PGB4 projected onto the first screen SCA when the size of the third user image PUC is changed and the enlargement ratio EL is adjusted.

The fourth projection image PGB4 includes the second user image PUB, the third user image PUC, the fourth user image PUD, the fifth user image PUE, and a third mark MC4.

The third mark MC4 indicates a size of the head image HC of the third user image PUC in the fourth projection image PGB4.

The image adjuster 152 adjusts the enlargement ratio EL to the second enlargement ratio EL2 such that the head image HC of the third user image PUC is displayed in the third size SZ3 in the fourth projection image PGB4. The second enlargement ratio EL2 is calculated by the following Expression (5).

$$EL2=EL3/PR2 \tag{5}$$

where, the third enlargement ratio EL3 is the enlargement ratio EL at the time when the third size SZ3 is designated as the size of the third mark MC1 as explained above. In other words, the third enlargement ratio EL3 is the enlargement ratio EL at the time when the first projection image PGB1 and the second projection image PGB2 shown in FIG. 5 are projected. As indicated by the following Expression (6), a second ratio PR2 is a ratio of the second size SZ2 to the third size SZ3.

$$PR2=SZ2/SZ3 \tag{6}$$

In FIG. 6, the second ratio PR2 is, for example, "3/2".

Therefore, as indicated by Expression (5), the image adjuster 152 reduces the enlargement ratio EL to "2/3" times as large as the third enlargement ratio EL3. As a result, as shown in the lower diagram of FIG. 6, the fourth projection image PGB4 is reduced to "2/3" times compared with the third projection image PGB3. As a result, as indicated by the third mark MC4, the size of the head image HC of the third user image PUC in the fourth projection image PGB4 is adjusted to the third size SZ3.

In this embodiment, the image adjuster 152 adjusts a size of the head image HC of the third user image PUC in the projection image PQ to the first size SZ1 or the third size SZ3. However, not only this, but, for example, the image adjuster 152 may adjust the size of the head image HC of the third user image PUC to be an actual size. In this case, for example, one of the first size SZ1 and the third size SZ3 may be designated to coincide with a size of the head of the third user UC.

5. Processing of the First Controller

Figure 7:
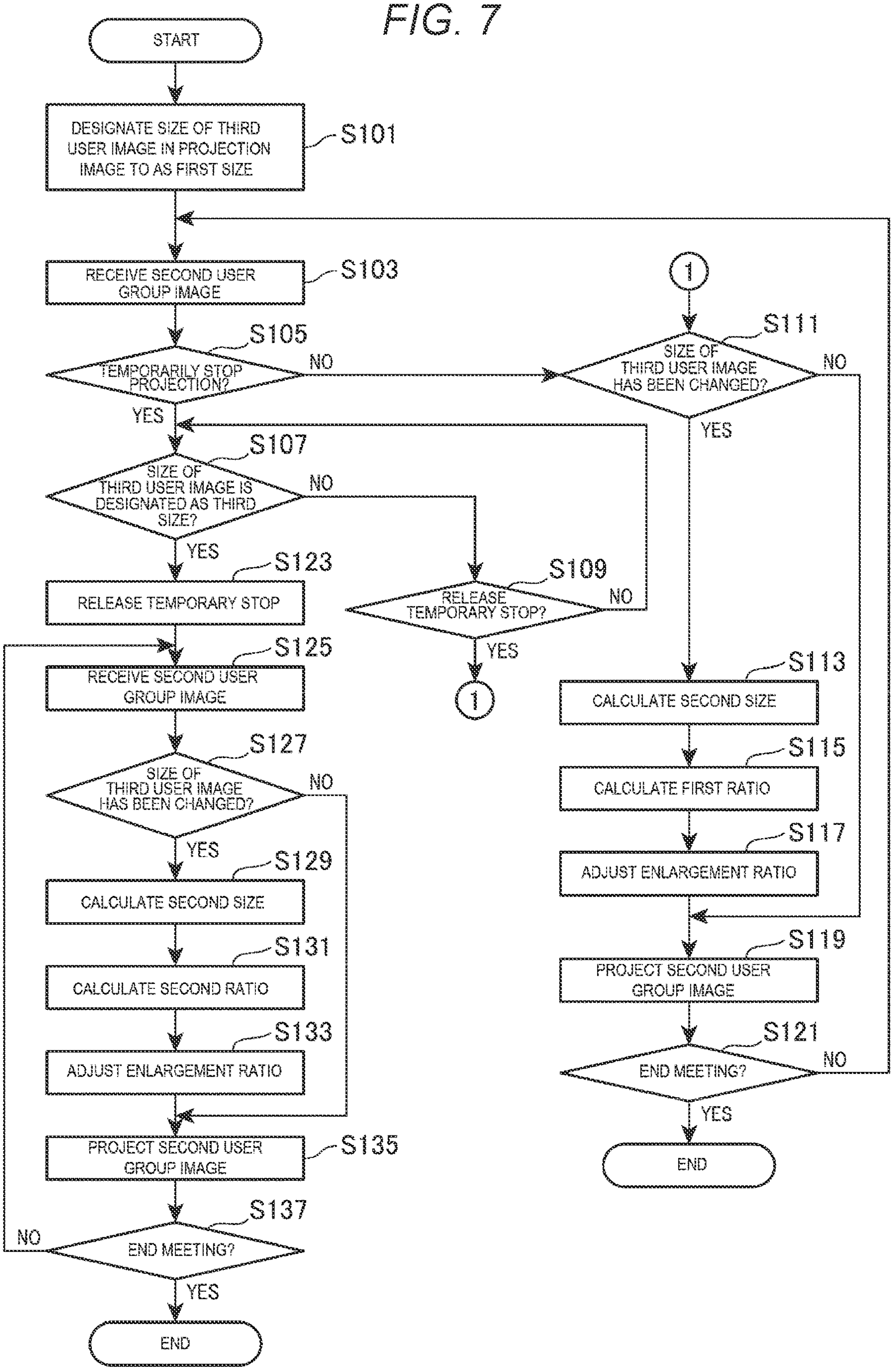
FIG. 7 is a flowchart showing an example of processing of the first controller.

Subsequently, processing of the first controller 150 of the first projector 100A is explained with reference to FIG. 7. FIG. 7 is a flowchart showing an example of the processing of the first controller 150 of the first projector 100A.

In this embodiment, as an initial state, the image adjuster 152 designates a size of the head image HC of the third user PUC, which is the projection image PQ, as the first size SZ1. Thereafter, the image adjuster 152 designates the size of the head image HC of the third user image PUC, which is the projection image PQ, as the third size SZ3.

As shown in FIG. 7, first, in step S101, the image adjuster 152 designates the size of the head image HC of the third user PUC, which is the projection image PQ, as the first size SZ1. The first size SZ1 is, for example, a size in which the head image HC is displayed in an actual size on the first screen SCA.

Subsequently, in step S103, the image adjuster 152 receives the second user group image PGB from the server device 200.

Subsequently, in step S105, the image adjuster 152 determines whether operation for temporarily stopping the projection of the first projector 100A has been received from the first user UA.

When the image adjuster 152 determines that the operation for temporarily stopping the projection of the first projector 100A has not been received (NO in step S105), the processing proceeds to step S111. When the image adjuster 152 determines that the operation for temporarily stopping the projection of the first projector 100A is received (YES in step S105), the processing proceeds to step S107.

In step S107, the image adjuster 152 determines whether operation for designating the size of the head image HC of the third user image PUC as the third size SZ3 has been received.

When the image adjuster 152 determines that the operation for designating the size of the head image HC of the third user image PUC as the third size SZ3 has been received (YES in step S107), the processing proceeds to step S123. When the image adjuster 152 determines that the operation for designating the size of the head image HC of the third user image PUC as the third size SZ3 has not been received (NO in step S107), the processing proceeds to step S109.

In step S109, the image adjuster 152 determines whether operation for releasing the temporary stop of the projection of the first projector 100A has been received from the first user UA.

When the image adjuster 152 determines that the operation for releasing the temporary stop of the projection of the first projector 100A has been received (YES in step S109), the processing proceeds to step S111. When the image adjuster 152 determines that the operation for releasing the temporary stop of the projection of the first projector 100A has not been received (NO in step S109), the processing returns to step S107.

In the case of NO in step S105 or in the case of YES in step S109, in step S111, the image adjuster 152 determines whether the size of the head image HC of the third user PUC, which is the projection image PQ, has been changed.

When the image adjuster 152 determines that the size of the head image HC of the third user image PUC has not been changed (NO in step S111), the processing proceeds to step S119. When the image adjuster 152 determines that the size of the head image HC of the third user image PUC has been changed (YES in step S111), the processing proceeds to step S113.

In step S113, the image adjuster 152 calculates the second size SZ2. The second size SZ2 is, for example, the size of the head image HC of the third user image PUC in the second user group image PGB projected onto the first screen SCA.

Subsequently, in step S115, the image adjuster 152 calculates the first ratio PR1. The first ratio PR1 is a ratio of the second size SZ2 to the first size SZ1.

Subsequently, in step S117, the image adjuster 152 adjusts the enlargement ratio EL to be the second enlargement ratio EL2. The second enlargement ratio EL2 is the enlargement ratio EL at which the head image HC of the third user image PUC is displayed in the first size SZ1 in the projection image PQ. The image adjuster 152 calculates the second enlargement ratio EL2 based on the first ratio PR1.

When step S117 ends and in the case of NO in step S111, in step S119, the image output unit 153 projects the second user group image PGB onto the first screen SCA.

Subsequently, in step S121, the first controller 150 determines whether to end a meeting. For example, when receiving an instruction to end the meeting from the first user UA, the first controller 150 ends the meeting. For example, when receiving end information indicating to end the meeting from the server device 200, the first controller 150 ends the meeting.

When the first controller 150 determines not to end the meeting (NO in step S121), the processing returns to step S103. When the first controller 150 determines to end the meeting (YES in step S121), thereafter, the processing ends.

In the case of YES in step S107, in step S123, the image adjuster 152 releases the temporary stop of the projection of the first projector 100A.

Subsequently, in step S125, the image adjuster 152 receives the second user group image PGB from the server device 200.

Subsequently, in step S127, the image adjuster 152 determines whether the size of the head image HC of the third user image PUC, which is the projection image PQ, has been changed.

When the image adjuster 152 determines that the size of the head image HC of the third user image PUC has not been changed (NO in step S127), the processing proceeds to step S135. When the image adjuster 152 determines that the size of the head image HC of the third user image PUC has been changed (YES in step S127), the processing proceeds to step S129.

Subsequently, in step S129, the image adjuster 152 calculates the second size SZ2.

Subsequently, in step S131, the image adjuster 152 calculates the second ratio PR2. The second ratio PR2 is a ratio of the second size SZ2 to the third size SZ3.

Subsequently, in step S133, the image adjuster 152 adjusts the enlargement ratio EL to be the second enlargement ratio EL2. The second enlargement ratio EL2 is the enlargement ratio EL at which the head image HC of the third user PUC is displayed in the third size SZ3 in the projection image PQ. The image adjuster 152 calculates the second enlargement ratio EL2 based on the second ratio PR2.

When step S133 ends and in the case of NO in step S127, in step S135, the image output unit 153 projects the second user group image PGB onto the first screen SCA.

Subsequently, in step S135, the first controller 150 determines whether to end the meeting.

When the first controller 150 determines not to end the meeting (NO in step S135), the processing returns to step S125. When the first controller 150 determines to end the meeting (YES in step S135), thereafter, the processing ends.

Step S101 corresponds to an example of the "receiving designation of a target image to be projected in a first size". Step S113 corresponds to an example of "calculating a second size". Step S117 corresponds to an example "adjusting an enlargement ratio".

6. Configurations and Effects

As explained above, the control method for the first projector 100A in this embodiment includes receiving designation of the head image HC of the third user image PUC to be projected in the first size SZ1 in, in the second user group image PGB, the projection image PQ obtained by the first projector 100A projecting the second user group image PGB onto the first screen SCA, calculating the second size SZ2 indicating a size of the head image HC of the third user image PUC in the projection image PQ when the size of the head image HC of the third user image PUC included in the second user group image PGB is changed, and adjusting, based on the first ratio PR1, which is a ratio of the second size SZ2 to the first size SZ1, the enlargement ratio EL of the projection image PQ with respect to the second user group image PGB such that the head image HC of the third user image PUC is displayed in the first size SZ1 in the projection image PQ.

With this configuration, the enlargement ratio EL of the projection image PQ with respect to the second user group image PGB is adjusted based on the first ratio PR1, which is the ratio of the second size SZ2 to the first size SZ1, such that the head image HC of the third user image PUC is displayed in the first size SZ1 in the projection image PQ. Accordingly, when the size of the head image HC of the third user image PUC in the second user group image PGB, which is the input image, is changed, the head image HC of the third user image PUC can be displayed in the first size SZ1 in the projection image PQ. Therefore, the head image HC of the third user image PUC can be displayed in a size desired by the user. As a result, convenience of the user can be improved.

In the control method for the first projector 100A, adjusting the enlargement ratio EL includes adjusting the enlargement ratio EL with the projection optical system 113 of the first projector 100A.

Accordingly, the enlargement ratio EL can be adjusted by adjusting the enlargement ratio EL with the projection optical system 113 of the first projector 100A. Therefore, the enlargement ratio EL can be adjusted by simple processing.

In the control method for the first projector 100A, adjusting the enlargement ratio EL includes scaling the head image HC of the third user image PUC with image processing.

Accordingly, the enlargement ratio EL can be adjusted by scaling the head image HC of the third user image PUC with the image processing. Therefore, it is unnecessary to set an upper limit and a lower limit for the enlargement ratio EL. As a result, the convenience of the user can be improved.

The control method for the first projector 100A further includes, when the third size SZ3 different from the first size SZ1 and indicating the size of the head image HC of the third user image PUC in the projection image PQ is designated, adjusting, based on the second ratio PR2, which is the ratio of the second size SZ2 to the third size SZ3, the enlargement ratio EL such that the head image HC of the third user image PUC is displayed in the third size SZ3 in the projection image PQ.

Accordingly, the head image HC of the third user image PUC can be displayed in the third size SZ3 in the projection image PQ by adjusting the enlargement ratio EL based on the second ratio PR2, which is the ratio of the second size SZ2 to the third size SZ3. Therefore, the head image HC of the third user image PUC can be displayed in a size desired by the user. As a result, the convenience of the user can be improved.

In the control method for the first projector 100A, in adjusting the enlargement ratio EL, the first size SZ1 is a size in which the head image HC of the third user image PUC is displayed in an actual size.

Accordingly, the head image HC of the third user image PUC can be displayed in an actual size by adjusting the enlargement ratio EL. Therefore, it is possible to improve realistic feeling of the projection image PQ projected by the first projector 100A.

In the control method for the first projector 100A, adjusting the enlargement ratio EL includes increasing the volume of voice corresponding to the third user UC when the enlargement ratio EL is reduced and reducing the volume of the voice corresponding to the third user UC when the enlargement ratio EL is increased.

Accordingly, when the enlargement ratio EL is reduced, the head of the third user UC is approaching the camera 180 of the second projector 100B. Therefore, the realistic feeling can be improved by increasing the volume of the voice corresponding to the third user UC. On the other hand, when the enlargement ratio EL is increased, the head of the third user UC is moving away from the camera 180 of the second projector 100B. Therefore, the realistic feeling can be improved by reducing the volume of the voice corresponding to the third user UC.

The first projector 100A in this embodiment includes the projection optical system 113 and the first processor 150A. The first processor 150A executes receiving designation of the head image HC of the third user image PUC to be projected in the first size SZ1 in, in the second user group image PGB, the projection image PQ obtained by the first projector 100A projecting the second user group image PGB onto the first screen SCA, calculating the second size SZ2 indicating the size of the head image HC of the third user image PUC in the projection image PQ when the size of the head image HC of the third user image PUC included in the second user group image PGB is changed, and adjusting, based on the first ratio PR1, which is the ratio of the second size SZ2 to the first size SZ1, the enlargement ratio EL of the projection image PQ with respect to the second user group image PGB such that the head image HC of the third user image PUC is displayed in the first size SZ1 in the projection image PQ.

With the first projector 100A in this embodiment, the same action effects as the action effects of the control method for the first projector 100A in this embodiment are achieved.

The first control program PG1 in this embodiment causes the first processor 150A to execute receiving designation of the head image HC of the third user image PUC to be projected in the first size SZ1 in, in the second user group image PGB, the projection image PQ obtained by the first projector 100A projecting the second user group image PGB onto the first screen SCA, calculating the second size SZ2 indicating the size of the head image HC of the third user image PUC in the projection image PQ when the size of the head image HC of the third user image PUC included in the second user group image PGB is changed, and adjusting, based on the first ratio PR1, which is the ratio of the second size SZ2 to the first size SZ1, the enlargement ratio EL of the projection image PQ with respect to the second user group image PGB such that the head image HC of the third user image PUC is displayed in the first size SZ1 in the projection image PQ.

With the first control program PG1 in this embodiment, the same action effects as the action effects of the control method for the first projector 100A in this embodiment are achieved.

7. Other Embodiments

The embodiment explained above illustrates an aspect of the present disclosure and can be optionally modified and applied in a range not departing from the gist of the present disclosure.

In this embodiment, for convenience, the meeting system 1 includes the two projectors 100. However, not only this, but the meeting system 1 may include three or more projectors 100.

In this embodiment, the camera 180 disposed in the second projector 100B generates the second user image PUB to the fifth user image PUE. However, not only this, but, for example, a smartphone communicably connected to the second projector 100B may generate each of the second user image PUB to the fifth user image PUE.

In this case, a second smartphone generates the second user image PUB and transmits the second user image PUB to the second projector 100B. A third smartphone generates the third user image PUC and transmits the third user image PUC to the second projector 100B. A fourth smartphone generates the fourth user image PUD and transmits the fourth user image PUD to the second projector 100B. A fifth smartphone generates the fifth user image PUE and transmits the fifth user image PUE to the second projector 100B. The second projector 100B combines the second user image PUB to the fifth user image PUE and generates the second user group image PGB.

In this embodiment, the microphone 160 disposed in the second projector 100B generates the second voice information SUB to the fifth voice information SUE. However, not only this, but, for example, a smartphone communicably connected to the second projector 100B may generate each of the second voice information SUB to the fifth voice information SUE.

In this case, a second smartphone generates the second voice information SUB and transmits the second voice information SUB to the second projector 100B. A third smartphone generates the third voice information SUC and transmits the third voice information SUC to the second projector 100B. A fourth smartphone generates the fourth voice information SUD and transmits the fourth voice information SUD to the second projector 100B. A fifth smartphone generates the fifth voice information SUE and transmits the fifth voice information SUE to the second projector 100B. The second projector 100B combines the second voice information SUB to the fifth voice information SUE and generates the second voice group information SGB.

In this embodiment, the "input image" is the second user group image PGB. However, not only this, but for example, the "input image" may be the third user image PUC. For example, the "input image" may be images of two or three persons among the second user image PUB to the fifth user image PUE.

In this embodiment, the "target image" is the head image HC of the third user image PUC. However, not only this, but the "target image" only has to be an image included in the second user group image PGB. For example, the "target image" may be a head image of the second user image PUB. The "target image" may be a head image of the fourth user image PUD.

For example, processing units of the flowchart of FIG. 7 are divided according to main processing contents in order to facilitate understanding of the processing of the first controller 150 of the first projector 100A. The present disclosure is not limited by a way of division and names of the processing units. The processing units may be divided into larger number of processing units according to processing contents. The processing units may be divided such that one processing unit includes a larger number of kinds of processing. Order of the processing may be changed as appropriate in a range not hindering the gist of the present disclosure.

The functional units shown in each of FIGS. 2 to 4 indicate functional components. Specific implementation modes of the functional units are not particularly limited. That is, hardware individually corresponding to the functional units do not always need to be implemented. One processor can also implement functions of a plurality of functional units by executing a program. A part of functions implemented by software in the embodiment explained above may be implemented by hardware or a part of functions implemented by hardware in the embodiment may be implemented by software. Besides, specific detailed configurations of the other units in each of the projector 100 and the server device 200 can also be optionally changed in a range not departing from the gist of the present disclosure.

Functional blocks of the first controller 150 of the first projector 100A shown in FIG. 3 can be implemented by causing the first processor 150A included in the first controller 150 of the first projector 100A to execute the first control program PG1 stored in the first memory 150B. The first control program PG1 can also be recorded in a computer-readable recording medium.

As the recording medium, a magnetic or optical recording medium or a semiconductor memory device can be used. Specifically, examples of the recording medium include portable or stationary recording media such as a flexible disk, an HDD (Hard Disk Drive), a CD-ROM (Compact Disk Read Only Memory), a DVD (Digital Versatile Disc), a Blu-ray (registered trademark) Disc, a magneto-optical disk, a flash memory, and a card-type recording medium. The recording medium may be a nonvolatile storage device such as a RAM, a ROM or an HDD, which is an internal storage device provided in the first projector 100A. The functional blocks of the first controller 150 of the first projector 100A can also be implemented by causing the server device 200 or the like to store the first control program PG1 and downloading the first control program PG1 from the server device 200 to the first controller 150 of the first projector 100A.

The functional blocks of the first controller 150 may be implemented by causing the server 200, a not-shown personal computer, or the like communicably connected to the first projector 100A to store the first control program PG1 and executing the first control program PG1 in the server device 200, the personal computer, or the like.

8. Summary of the Present Disclosure

A summary of the present disclosure is noted below.

Note 1

A control method for a projector, including: receiving designation of a target image to be projected in a first size in, in an input image, a projection image obtained by a projector projecting the input image onto a projection surface; calculating a second size indicating a size of the target image in the projection image when the size of the target image included in the input image is changed; and adjusting, based on a first ratio, which is a ratio of the second size to the first size, an enlargement ratio of the projection image with respect to the input image such that the target image is displayed in the first size in the projection image.

Consequently, the enlargement ratio of the projection image with respect to the input image is adjusted based on the first ratio, which is the ratio of the second size indicating the size of the target image in the projection image to the first size indicating the size of the target image in the projection image, such that the target image is displayed in the first size in the projection image.

Accordingly, when the size of the target image in the input image is changed, the size of the target image can be displayed in the first size in the projection image. Therefore, the target image can be displayed in a size desired by a user. As a result, convenience of the user can be improved.

Note 2

The control method for the projector described in Note 1, wherein adjusting the enlargement ratio includes adjusting the enlargement ratio with an optical device of the projector.

Consequently, the enlargement ratio can be adjusted by adjusting an enlargement ratio of the optical device of the projector. Therefore, the enlargement ratio can be adjusted by simple processing.

Note 3

The control method for the projector described in Note 1 or Note 2, wherein adjusting the enlargement ratio includes scaling the target image with image processing.

Consequently, the enlargement ratio can be adjusted by scaling the target image with the image processing. Therefore, it is unnecessary to set an upper limit and a lower limit in the enlargement ratio. As a result, the convenience of the user can be improved.

Note 4

The control method for the projector described in any one of Note 1 to Note 3, further including, when a third size different from the first size and indicating a size of the target image in the projection image is designated, adjusting the enlargement ratio based on a second ratio, which is a ratio of the second size to the third size, such that the target image is displayed in the third size in the projection image.

Consequently, the target image can be displayed in the third size in the projection image by adjusting the enlargement ratio based on the second ratio, which is the ratio of the second size to the third size. Therefore, the target image can be displayed in a size desired by the user. As a result, the convenience of the user is improved.

Note 5

The control method for the projector described in any one of Note 1 to Note 4, wherein, in adjusting the enlargement ratio, when the target image is an image of a person, the first size is a size in which the person is displayed in an actual size.

Consequently, the person can be displayed in the actual size by adjusting the enlargement ratio to the first size. Therefore, realistic feeling of the projection image projected by the projector can be improved.

Note 6

The control method for the projector described in any one of Note 1 to Note 5, wherein adjusting the enlargement ratio includes: increasing volume of voice corresponding to the target image when the enlargement ratio is reduced; and reducing the volume of the voice corresponding to the target image when the enlargement ratio is increased.

Consequently, when the enlargement ratio is reduced, a user corresponding to the target image is approaching a camera. Therefore, the realistic feeling can be improved by increasing the volume of the voice corresponding to the target image. On the other hand, when the enlargement ratio is increased, the user corresponding to the target image is moving away from the camera. Therefore, the realistic feeling can be improved by reducing the volume of the voice corresponding to the target image.

Note 7

A projector including: an optical device; and at least one processor, the at least one processor executing: receiving designation of a target image to be projected in a first size in, in an input image, a projection image obtained by the optical device projecting the input image onto a projection surface; calculating a second size indicating a size of the target image in the projection image when the size of the target image included in the input image is changed; and adjusting, based on a first ratio that is a ratio of the second size to the first size, an enlargement ratio of the projection image with respect to the input image such that the target image is displayed in the first size in the projection image.

Consequently, the projector described in Note 7 achieves the same effects as the effects of the control method for the projector described in Note 1.

Note 8

A non-transitory computer-readable storage medium storing a program, the program causing a processor to execute: receiving designation of a target image to be projected in a first size in, in an input image, a projection image obtained by a projector projecting the input image onto a projection surface; calculating a second size indicating a size of the target image in the projection image when the size of the target image included in the input image is changed; and adjusting, based on a first ratio that is a ratio of the second size to the first size, an enlargement ratio of the projection image with respect to the input image such that the target image is displayed in the first size in the projection image.

Consequently, the non-transitory computer-readable storage medium storing the program described in Note 8 achieves the same effects as the effects of the control method for the projector described in Note 1.

What is claimed is:

1. A control method for a projector, comprising:

receiving designation of a target image to be projected in a first size, in an input image, a projection image obtained by a projector projecting the input image onto a projection surface;

calculating a second size indicating a size of the target image in the projection image when the size of the target image included in the input image is changed; and adjusting, based on a first ratio, which is a ratio of the second size to the first size, an enlargement ratio of the projection image with respect to the input image such that the target image is displayed in the first size in the projection image wherein adjusting the enlargement ratio includes:

increasing volume of voice corresponding to the target image by a percentage corresponding to a percentage reduction of the enlargement ratio when the enlargement ratio is reduced; and reducing the volume of the voice corresponding to the target image by a percentage corresponding to a percentage increase of the enlargement ratio when the enlargement ratio is increased.

2. The control method for the projector according to claim 1, wherein adjusting the enlargement ratio includes adjusting the enlargement ratio with an optical device of the projector.

3. The control method for the projector according to claim 1, wherein adjusting the enlargement ratio includes scaling the target image with image processing.

4. The control method for the projector according to claim 1, further comprising, when a third size different from the first size and indicating a size of the target image in the projection image is designated, adjusting the enlargement ratio based on a second ratio, which is a ratio of the second size to the third size, such that the target image is displayed in the third size in the projection image.

5. The control method for the projector according to claim 1, wherein, in adjusting the enlargement ratio, when the target image is an image of a person, the first size is a size in which the person is displayed in an actual size.

6. A projector comprising:

an optical device; and at least one processor, the at least one processor executing:

receiving designation of a target image to be projected in a first size, in an input image, a projection image obtained by the optical device projecting the input image onto a projection surface;

calculating a second size indicating a size of the target image in the projection image when the size of the target image included in the input image is changed; and adjusting, based on a first ratio that is a ratio of the second size to the first size, an enlargement ratio of the projection image with respect to the input image such that the target image is displayed in the first size in the projection image wherein adjusting the enlargement ratio includes:

increasing volume of voice corresponding to the target image by a percentage corresponding to a percentage reduction of the enlargement ratio when the enlargement ratio is reduced; and reducing the volume of the voice corresponding to the target image by a percentage corresponding to a percentage increase of the enlargement ratio when the enlargement ratio is increased.

7. The projector according to claim 6, wherein adjusting the enlargement ratio includes adjusting the enlargement ratio with an optical device of the projector.

8. The projector according to claim 6, wherein adjusting the enlargement ratio includes scaling the target image with image processing.

9. The projector according to claim 6, the at least one processor further executing, when a third size different from the first size and indicating a size of the target image in the projection image is designated, adjusting the enlargement ratio based on a second ratio, which is a ratio of the second size to the third size, such that the target image is displayed in the third size in the projection image.

10. The projector according to claim 6, wherein, in adjusting the enlargement ratio, when the target image is an image of a person, the first size is a size in which the person is displayed in an actual size.

11. A non-transitory computer-readable storage medium storing a program, the program causing a processor to execute:

receiving designation of a target image to be projected in a first size, in an input image, a projection image obtained by a projector projecting the input image onto a projection surface;

calculating a second size indicating a size of the target image in the projection image when the size of the target image included in the input image is changed; and adjusting, based on a first ratio that is a ratio of the second size to the first size, an enlargement ratio of the projection image with respect to the input image such that the target image is displayed in the first size in the projection image wherein adjusting the enlargement ratio includes:

increasing volume of voice corresponding to the target image by a percentage corresponding to a percentage reduction of the enlargement ratio when the enlargement ratio is reduced; and reducing the volume of the voice corresponding to the target image by a percentage corresponding to a percentage increase of the enlargement ratio when the enlargement ratio is increased.

12. The non-transitory computer-readable storage medium according to claim 11, wherein adjusting the enlargement ratio includes adjusting the enlargement ratio with an optical device of the projector.

13. The non-transitory computer-readable storage medium according to claim 11, wherein adjusting the enlargement ratio includes scaling the target image with image processing.

14. The non-transitory computer-readable storage medium according to claim 11, the program further causing the processor to execute, when a third size different from the first size and indicating a size of the target image in the projection image is designated, adjusting the enlargement ratio based on a second ratio, which is a ratio of the second size to the third size, such that the target image is displayed in the third size in the projection image.

15. The non-transitory computer-readable storage medium according to claim 11, wherein, in adjusting the enlargement ratio, when the target image is an image of a person, the first size is a size in which the person is displayed in an actual size.

* * * * *